(12) United States Patent
Napier et al.

(10) Patent No.: US 12,180,081 B2
(45) Date of Patent: Dec. 31, 2024

(54) PROCESS FOR RECOVERING LITHIUM VALUES

(71) Applicants: LITHIUM AUSTRALIA NL, West Perth (AU); AUSTRALIAN NUCLEAR SCIENCE AND TECHNOLOGY ORGANISATION, Lucas Heights (AU)

(72) Inventors: Andrew Napier, West Perth (AU); Christopher Griffith, Lucas Heights (AU)

(73) Assignees: LIVIUM LTD., Kew (AU); AUSTRALIAN NUCLEAR SCIENCE AND TECHNOLOGY ORGANISATION, Lucas Heights (AU)

( * ) Notice: Subject to any disclaimer, the term of this patent is extended or adjusted under 35 U.S.C. 154(b) by 975 days.

(21) Appl. No.: 17/058,707

(22) PCT Filed: May 30, 2019

(86) PCT No.: PCT/AU2019/050540
§ 371 (c)(1),
(2) Date: Nov. 25, 2020

(87) PCT Pub. No.: WO2019/227157
PCT Pub. Date: Dec. 5, 2019

(65) Prior Publication Data
US 2021/0206651 A1    Jul. 8, 2021

(30) Foreign Application Priority Data
May 30, 2018   (AU) ................................ 2018901928

(51) Int. Cl.
C22B 7/00 (2006.01)
C01B 25/30 (2006.01)
(Continued)

(52) U.S. Cl.
CPC ............ *C01D 15/005* (2013.01); *C01B 25/30* (2013.01); *C01D 15/06* (2013.01)

(58) Field of Classification Search
None
See application file for complete search history.

(56) References Cited

U.S. PATENT DOCUMENTS

2009/0117022 A1   5/2009   Nuspl et al.
2013/0129586 A1   5/2013   Chon et al.
(Continued)

FOREIGN PATENT DOCUMENTS

CN   101767782 A       7/2010
CN   108110357 A   *   6/2018
(Continued)

OTHER PUBLICATIONS

Extended European Search Report for corresponding European patent application No. 19811213.8 dated Feb. 7, 2022, seven pages.
(Continued)

*Primary Examiner* — Yun Qian
(74) *Attorney, Agent, or Firm* — Harness, Dickey & Pierce, P.L.C.

(57) ABSTRACT

A process for recovering lithium phosphate and lithium sulfate from a lithium-bearing solution, such as a brine or pregnant process liquor is described. The process includes adding phosphate to the lithium-bearing solution to precipitate lithium phosphate and then separating the resulting lithium phosphate precipitate from the solution. The separated lithium phosphate precipitate is then digested in sulphuric acid to produce a digestion mixture from which a lithium sulfate precipitate is separated. An alkali metal hydroxide is added to the separated solution to produce an alkali metal phosphate solution and this is recycled for use as phosphate in the first step of the process.

20 Claims, 1 Drawing Sheet

(51) Int. Cl.
    *C01D 15/00*     (2006.01)
    *C01D 15/06*     (2006.01)

(56)     References Cited

U.S. PATENT DOCUMENTS

| | | |
|---|---|---|
| 2017/0084965 A1 | 3/2017 | Song |
| 2018/0170763 A1 | 6/2018 | Byun et al. |
| 2019/0233297 A1 | 8/2019 | Kim et al. |

FOREIGN PATENT DOCUMENTS

| | | |
|---|---|---|
| JP | 2011168858 A | 9/2011 |
| KR | 20160002579 A | 1/2016 |
| KR | 101771596 B1 | 8/2017 |
| KR | 101803380 B1 | 12/2017 |
| WO | 2017139852 A1 | 8/2017 |
| WO | WO-2018027266 A1 | 2/2018 |
| WO | WO-2018070726 A1 | 4/2018 |

OTHER PUBLICATIONS

Office Action for corresponding Chinese application No. 201980051364.3 dated Mar. 3, 2022, with English translation, 10 pages.
International Search Report and Written Opinion of the International Searching Authority, issued in PCT/AU2019/050540, mailed Jun. 28, 2019; ISA/AU.

\* cited by examiner

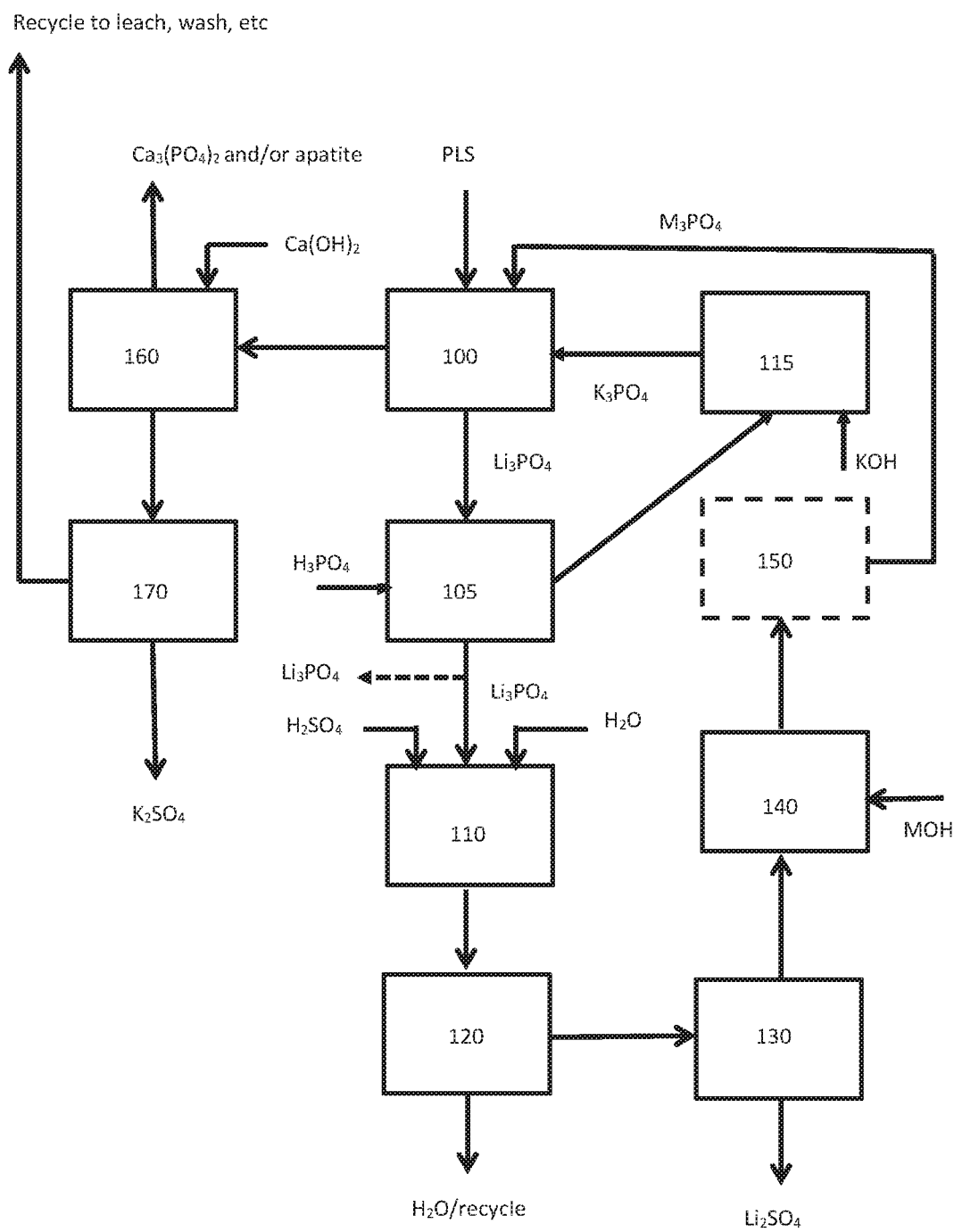

PROCESS FOR RECOVERING LITHIUM VALUES

CROSS-REFERENCE TO RELATED APPLICATIONS

This application is a 371 U.S. National Phase of International Application No. PCT/AU2019/050540, filed May 30, 2019, which claims priority to Australian Application No. 2018901928, filed May 30, 2018. The entire disclosures of the above applications are incorporated herein by reference.

TECHNICAL FIELD

The present disclosure relates to a process for recovering lithium values, in particular to a process for recovering lithium phosphate and lithium sulfate from a lithium-bearing solution such as a brine or a pregnant process liquor.

BACKGROUND

Lithium salts, such as lithium carbonate or lithium hydroxide, are used in the production of lithium ion batteries, glass, ceramics, pharmaceuticals, lubricants, air treatment, aluminium smelting. They also have potential application in electronic vehicles, lithium-aluminium alloys for aircraft and smart grid storage systems.

Lithium carbonate and lithium hydroxide may be recovered from lithium silicates such as spodumene and lepidolite or from brines, salars, salt lakes, salt mines and geothermal resources. The lithium-bearing solutions from which the lithium carbonate and lithium hydroxide salts are recovered also contain other alkali metal and alkaline earth metal cations at comparable if not greater concentrations leading to separation difficulties. For example, in an evaporation process calcium will concentrate with magnesium and both alkaline earth metals have to be removed prior to separating lithium carbonate from solution. Similarly, sodium and potassium salts are also difficult to separate from such mixed metal solutions. Recovery processes are consequently designed to manage relative ratios of magnesium, calcium, sodium and potassium such that undesirable impurities remain in solution and viable quantities of the desired lithium salts at required purities are precipitated.

It would be economically beneficial if the alkali metal and alkaline earth metal cations in the lithium-bearing solutions could be recovered as saleable byproducts or recycled for use in the process upstream.

Moreover, the solubility of lithium carbonate and lithium hydroxide in water is 1.3 g/100 mL at 25° C. and 12.7 g/100 mL at 25° C., respectively. Consequently, the recovery of these salts as solids from brines and pregnant process liquors may require complex multi-stage processes to concentrate the purified solutions to above the solubility limits of these lithium salts. Evaporation to either handle the water balance or crystallise soluble salts such as hydroxide in conventional lithium (Li) processing circuits is energy and capital intensive. This problem is compounded where the tenor or grade of lithium is low in the source of interest.

Accordingly, there is a need to develop a process for recovery of lithium salts from lithium-bearing solutions to overcome at least some of the aforementioned problems.

The discussion of the background to the disclosure is intended to facilitate an understanding of the disclosure. However, it should be appreciated that the discussion is not an acknowledgement or admission that any of the material referred to was published, known or part of the common general knowledge as at the priority date of the application.

SUMMARY

The present disclosure provides a process for recovering lithium values, in particular to a process for recovering lithium phosphate and lithium sulfate from a lithium-bearing solution such as a brine or a pregnant process liquor.

The process for recovering lithium phosphate and lithium sulfate from a lithium-bearing solution comprises:
a) adding phosphate to the lithium-bearing solution to produce a lithium phosphate precipitate;
b) separating the lithium phosphate precipitate from a solution produced in step a);
c) digesting the separated lithium phosphate precipitate in sulfuric acid to precipitate lithium sulfate, and separating the lithium sulfate precipitate therefrom; and
d) adding alkali metal hydroxide to the separated digestion mixture from step c) to produce an alkali metal phosphate solution and recycling the alkali metal phosphate solution to step a) for use as the phosphate.

In some embodiments, phosphate is added to the lithium-bearing solution in step a) in stoichiometric excess so that soluble lithium remaining in solution may be less than 500 mg/L and/or residual phosphate (P) remaining in solution may be greater than 100 mg/L. In some embodiments, the soluble lithium remaining in solution may be 50-100 mg/L and P remaining in solution may be 500-3000 mg/L.

In one embodiment, prior to step c), the separated lithium phosphate precipitate may be re-precipitated from phosphoric acid. In this way, major impurities such as K, Na, and S may be reduced by an order of magnitude.

In one embodiment, the digestion mixture in step c) may comprise from 10-50 wt % lithium phosphate solids with lithium remaining in solution up to solubility limits of lithium sulfate in phosphoric acid, in particular between 30-35 g/L.

In some embodiments, digesting the separated lithium phosphate precipitate in sulfuric acid in step c) occurs at a temperature from ambient to 80° C. within 1-4 h, in particular 1-2 h.

In some embodiments, the digestion mixture may be concentrated to provide a $H_3PO_4$ concentration of up to 70 wt %, in particular 25-65 wt % $H_3PO_4$.

In some embodiments, prior to performing step a), the process may comprise softening the lithium-bearing solution by decreasing the calcium content thereof to less than 25 ppm. In some embodiments, the softening step may comprise adding potassium carbonate or potassium phosphate to the lithium-bearing solution to produce calcium precipitates comprising calcium carbonate or apatite. In other embodiments, the softening step may comprise adding alkali metal phosphates, such as sodium phosphate, to the lithium-bearing solution to produce calcium precipitates comprising apatite. In one particular embodiment, when the lithium-bearing solution contains fluoride, the calcium precipitate may comprise fluoroapatite and apatite. The calcium precipitates may be separated from the softened solution prior to step a).

In some embodiments, the process may further comprise:
e) recovering phosphate from the separated solution of step b) as tri-calcium phosphate and/or apatite. Said tri-calcium phosphate and/or apatite may be separated from the solution produced in step e). In these embodiments, recovering phosphate from the separated solution of step b) as tri-calcium phosphate and/or apatite may comprise adding calcium hydroxide to said separated solution.

In further embodiments, the process may further comprise:

f) recovering potassium from a separated solution from step e) as potassium sulfate. In these particular embodiments, recovering potassium from the separated solution from step e) as potassium sulfate comprises concentrating and/or cooling the separated solution from step e) and subsequently separating potassium sulfate.

BRIEF DESCRIPTION OF DRAWINGS

Notwithstanding any other forms which may fall within the scope of the process as set forth in the Summary, specific embodiments will now be described, by way of example only, with reference to the accompanying FIGURES in which:

FIG. 1 is a process flow sheet depicting a process for producing lithium phosphate from a lithium-bearing solution.

DESCRIPTION OF EMBODIMENTS

The disclosure relates to a process to produce lithium phosphate, in particular lithium phosphate and lithium sulfate from a lithium-bearing solution such as a brine or a pregnant process liquor.

General Terms

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

Specific Terms

The term 'lithium-bearing solution' as used herein will be understood to refer to an aqueous liquor containing lithium. Such liquors may originate from a natural source such as a brine. Alternatively, such liquors may be a by-product of mining, drilling, dewatering and excavation activities, particularly in the form of produced water or wastewater streams. For example, the lithium-bearing solution may be produced water from oil and gas drilling, coal seam methane production and so forth. Alternatively, the aqueous liquor may be a hydrometallurgical processing liquor (otherwise referred to as a pregnant process liquor) produced by a lithium extraction process. In some embodiments, the aqueous liquor containing lithium may be a processing liquor produced by extracting lithium from recycled lithium batteries or other e-waste. It will be appreciated that the concentration of lithium in the lithium-bearing solution will vary depending on its source and that the lithium-bearing solution may undergo one or more processes to increase the lithium content thereof to a concentration suitable to undergo the process as described herein.

The lithium-bearing solution may contain one or more impurities. The term "impurities" as used herein refers to a metal value, other than lithium, co-dissolved in the lithium-bearing solution. Examples of typical impurities include but are not limited to Na, Cs, Rb, Si, Al, Mg, Mn and Fe. It will be appreciated that the lithium-bearing solution may undergo one or more processes to remove or deplete the lithium-bearing solution of the one or more impurities prior to undergoing the process as described therein.

The term 'apatite' as used herein refers to one or more calcium phosphate compounds of general formula $Ca_5(PO_4)_3(F, Cl, OH)$ (repeating unit) and may include hydroxyapatite, fluorapatite, chlorapatite or admixtures thereof.

Process for Recovering Lithium Phosphate and/or Lithium Sulphate

Calcium is frequently present in undesirable concentrations in lithium-bearing solutions, in particular pregnant process liquors, because the pregnant process liquor may have been previously treated with an excess of lime to precipitate metal impurities such as calcium aluminates and calcium silicates out of solution. It is conventional practice to subsequently deplete (or 'soften') the pregnant process liquor of calcium by adding sodium carbonate to precipitate calcium carbonate. However, the concentration of sodium consequently also rises, thereby making it difficult to separate valuable potassium byproducts from solution.

Some of the embodiments described in the present disclosure provide an alternative process for softening the lithium-bearing solution to decrease calcium content thereof from approximately 500 ppm to less than 25 ppm, in particular less than 20 ppm. In certain embodiments wherein the lithium-bearing solution also contains fluoride, said process may also be advantageously employed to decrease fluoride content to less than 5 ppm, in particular to a fluoride content in a range of 1-3 ppm.

In various embodiments of the disclosure, it will be understood that the concentration of lithium in the lithium-bearing solution may be greater than 1 g/L, in particular greater than 4 g/L.

In some embodiments, the step of decreasing a calcium content of the lithium-bearing solution comprises adding potassium carbonate thereto to produce calcium precipitates such as calcium carbonate, as well as magnesium carbonate. Potassium carbonate may be added to the lithium-bearing solution as a 20% w/w solution at a temperature from ambient to 90° C., in particular from 50° C. to 60° C. The amount of potassium carbonate added to the lithium-bearing solution may be sufficient to eliminate residual calcium content in the lithium-bearing solution or at least to reduce the calcium content in the lithium-bearing solution to less than 25 ppm, in particular 20 ppm.

In embodiments wherein the lithium-bearing solution contains fluoride, management of fluoride is important because some fluoride may report to lithium phosphate produced downstream, as will be described later. The inventors have found that potassium phosphate may be added to the lithium-bearing solution to facilitate the softening step and decrease calcium content therein by producing calcium phosphate. Moreover, the step of adding potassium phosphate to the lithium-bearing solution also produces fluoroapatite (calcium fluorophosphates, $Ca_5(PO_4)_3F$). Production of fluoroapatite not only decreases calcium content of the lithium-bearing solution to less than 25 ppm but also decreases fluoride content to less than 5 ppm, in particular 1-3 ppm.

Potassium phosphate may be added to the lithium-bearing solution as a 100 g/L-800 g/L $K_3PO_4$ solution in one or more aliquots to greater than 100% stoichiometric addition (wrt fluoroapatite formation), in particular 200% to 500% stoichiometric addition (wrt fluoroapatite formation). There are advantages in adding a concentrated $K_3PO_4$ solution because it reduces the dilution of the process flow, maximises lithium phosphate precipitation downstream and minimises lithium remaining in solution in the barrens. Moreover, most of the fluoride in the lithium-bearing solution may be precipitated as fluoroapatite, thereby decreasing the fluoride concentration to less than 5 ppm. The inventors opine that calcium fluorophosphate is the main phase that is produced during initial addition of potassium phosphate, with concurrent production of calcium phosphate and hydroxyapatite.

In embodiments wherein the lithium-bearing solution contains fluoride, softening said solution by adding greater than a 100% stoichiometric amount of potassium phosphate thereto provides a simple processing option to remove calcium and fluoride without the need for ion exchange. It will be appreciated that in embodiments wherein the lithium-bearing solution does not contain appreciable amounts of fluoride, potassium phosphate may be used as an alternative softening agent to potassium carbonate as described above.

It will be appreciated that in embodiments where the lithium-bearing solution has a high Na content, such as in brines, the 'softening' step may be performed by adding sodium phosphate to the lithium-bearing solution instead of potassium phosphate in similar amounts as described above to produce calcium phosphate and fluoroapatite (if fluoride is present in the lithium-bearing solution). Alternatively, another alkali metal phosphate may be employed in the softening step.

Referring to the accompanying FIGURE, the process as disclosed herein further comprises adding phosphate to the softened lithium-bearing solution to precipitate lithium phosphate (100).

Phosphate may be added as an aqueous solution. The phosphate may be selected from the group comprising phosphoric acid, potassium phosphate, sodium phosphate, or a combination thereof. It will be appreciated that the concentration of the aqueous phosphate solution will be practically limited by its solubility. For example, the concentration of an aqueous potassium phosphate solution may be from 100 g/L to 800 g/L. Phosphate may be added to the softened lithium-bearing solution in stoichiometric excess to ensure that soluble lithium remaining in solution is less than 100 mg/L and residual P remaining in solution is greater than 500 mg/L, in particular 500 mg/L to 3000 mg/L.

In embodiments wherein the phosphate solution comprises phosphoric acid, hydroxide ions (e.g. KOH) may be concurrently added to the softened lithium-bearing solution in an amount sufficient to maintain the pH of said solution above a threshold pH where lithium phosphate may re-dissolve and raise the soluble lithium in solution to greater than 100 mg/L.

Adding phosphate to the softened lithium-bearing solution to precipitate lithium phosphate may be performed at a temperature ranging from 50° C. to below boiling point of the solution, in particular greater than 90° C.

Lithium phosphate precipitate may be separated from solution by conventional separation techniques and washed in several stages. Suitable separation techniques include, but are not limited to, filtration, gravity separation, centrifugation, decantation and so forth. The mother liquor and wash filtrates may be combined and may undergo a de-phosphorylation step (160) as will be described later.

The separated lithium phosphate precipitate may then be optionally dried and transported for sale. Alternatively, or additionally, in some embodiments the lithium phosphate precipitate may then be treated to re-precipitate lithium phosphate, thereby reducing major impurities such as K, Na and S. This particular treatment step (105) comprises at least partially dissolving lithium phosphate precipitate in phosphoric acid to form di-lithium phosphate ($Li_2HPO_4$), according to Equations (1) and (2):

$$Li_3PO_4 + 2H_3PO_4 \rightarrow 3LiH_2PO_4 \qquad (1)$$

$$2Li_3PO_4 + H_3PO_4 \rightarrow 3Li_2HPO_4 \qquad (2)$$

The inventors opine that although di-lithium phosphate is the dominant aqueous species and precipitates upon reaching saturation, it is thermodynamically unstable and quickly converts to lithium phosphate, thereby regenerating phosphoric acid.

Advantageously, the refining step (105) may lead to at least an order of magnitude reduction in K, Na and S. One particular example of the reduction in impurities from test work is shown in the table below:

|  | K (% w/w) | Na (% w/w) | S (% w/w) |
| --- | --- | --- | --- |
| Lithium phosphate | 0.25-0.35 | 0.15-0.25 | 0.51-0.57 |
| Re-precipitated lithium phosphate | 0.008 | 0.005 | 0.027 |

In some embodiments, the lithium phosphate precipitate may be mixed with phosphoric acid to produce a slurry having % solids in the range of 15-40% wt. The amount of phosphoric acid required may be sub-stoichiometric with respect to the complete "dissolution" of the lithium phosphate precipitate as $Li_2HPO_4$. For example, the amount of phosphoric acid required may be in the range of 50 kg/t to 250 kg/t of lithium phosphate precipitate.

The step of re-precipitating lithium phosphate may be performed at ambient temperature or around 30° C. The dissolution and re-precipitation of lithium phosphate may be performed for a period of between 4 h to 24 h. A residence time of about 24 h may be beneficial to achieve the maximum rejection of impurities at lower stoichiometric additions of phosphoric acid.

Recovery of lithium as re-precipitated lithium phosphate may be greater than 95%. It will be appreciated that the amount of lithium phosphate remaining soluble in the liquor from the refining step may be dependent on the pH and solids content of the process stream. In one embodiment, the pH may be in a range of pH 4 to pH 6, in particular pH 5-pH 5.5.

The re-precipitated lithium phosphate precipitate may be separated from solution by conventional separation techniques and washed in several stages. Suitable separation techniques include, but are not limited to, filtration, gravity separation, centrifugation, decantation and so forth. Potassium hydroxide may be subsequently added to the separated liquor (115) to regenerate a potassium phosphate stream. At least part of the potassium phosphate stream may then be recycled for use in step a) as a source of phosphate or as an alternative 'softening' agent as described above.

The dried, separated lithium phosphate may be stored and subsequently transported for sale, or used as a feedstock for other processes. Alternatively, or additionally, in some embodiments at least some of the separated lithium phosphate may be further treated with sulphuric acid to produce lithium sulfate.

Advantageously, producing lithium sulfate may remove residual fluoride or other contaminants. In these particular embodiments, the separated lithium phosphate precipitate may be digested in sulfuric acid (110) according to Equation (3):

$$2Li_3PO_4 + 3H_2SO_4 \rightarrow 3Li_2SO_4 + H_3PO_4 \tag{3}$$

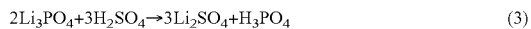

The pH of the resulting digestion mixture may be less than 3, in particular about 1.5. The digestion mixture may comprise up to 50 wt %, in particular 10-30 wt % lithium phosphate solids with between 30-35 g/L lithium in solution. Surprisingly, the extent of lithium phosphate digestion and lithium sulfate conversion does not appear to be affected by increasing solids content and some lithium sulfate crystallisation may occur during digestion.

It will be appreciated that the rate of digestion will depend on the temperature and concentration of lithium phosphate solids in the digestion mixture. Complete digestion may occur at temperature in a range of from ambient to 80° C. within 1 h-4 h, in particular 1 h-2 h. Typically, digestion may occur at 50° C. within 2 h.

Although it will be appreciated that there may be some lithium sulfate crystallisation during the digestion step, in various embodiments isolation of lithium sulfate may be undertaken by an evaporative crystallisation step. The resulting digestion liquor may be concentrated (120) by evaporation or vacuum pressure to provide a $H_3PO_4$ concentration of up to 70 wt %, in particular 25-65 wt %. At $H_3PO_4$ concentration of greater than 60 wt %, the resultant mixtures are extremely viscous and the inventors note that between 55-60 wt % $H_3PO_4$ may be a practical upper limit, wherein about 80% crystallisation of lithium sulfate is achieved. At least 5% of lithium may report to the lithium sulfate crystallisation liquor. However, this can be recycled via potassium phosphate generation and back to the lithium phosphate production step (100) as described later.

The lithium sulfate precipitate may be separated (130) from the concentrated digestion liquor by conventional separation techniques. Suitable separation techniques include, but are not limited to, filtration, gravity separation, centrifugation, decantation and so forth.

The remaining filtrate (or supernatant) may be up to 70 wt % in phosphoric acid, in particular 25-65 wt %. This particular stream may then be recycled upstream as the source of phosphate to precipitate lithium phosphate. Alternatively, the remaining filtrate (or supernatant) may be neutralised (140) by addition of potassium hydroxide or a mixture of potassium carbonate and potassium hydroxide. The resulting potassium phosphate solution may, in turn, be recycled (150) upstream as the source of phosphate to precipitate lithium phosphate from the lithium-bearing solution.

In some embodiments, the filtrate and/or the supernatant from which the lithium phosphate precipitate has been separated may undergo a de-phosphorylation process (160) in which soluble phosphate remaining in the filtrate or the supernatant is recovered as tri-calcium phosphate and/or apatite.

The de-phosphorylation process (160) comprises adding calcium hydroxide to the filtrate or the supernatant to produce tri-calcium phosphate and/or apatite precipitate. The calcium hydroxide may be selected from a group comprising hydrated lime, quicklime, slaked lime and mixtures thereof.

The tri-calcium phosphate and/or apatite precipitate may be separated from the resulting liquor by conventional separation techniques. Suitable separation techniques include, but are not limited to, filtration, gravity separation, centrifugation, decantation and so forth. It will be appreciated that in some embodiments calcium carbonate may co-precipitate with tri-calcium phosphate and/or apatite.

Although the liquor remaining after recovery of tri-calcium phosphate and/or apatite may be a potassium-rich liquor, it may also contain low levels of sodium (less than 20 g/L Na). Potassium sulfate may be recovered from said liquor by concentrating (170) said liquor to promote crystallisation of potassium sulfate with subsequent separation. The liquor may be concentrated to up to 10% of its original volume by evaporating the liquor at a temperature from ambient temperature to less than 120° C. Alternatively, or additionally, crystal growth or increased particle size of potassium sulfate may be promoted by cooling the resulting concentrated liquor to about 10° C.

The potassium sulfate precipitate may be separated from the concentrated liquor by conventional separation techniques. Suitable separation techniques include, but are not limited to, filtration, gravity separation, centrifugation, decantation and so forth.

In some embodiments, wherein the liquor remaining after recovery of tri-calcium phosphate and/or apatite is potassium-rich but also contains higher levels of sodium, it is likely that glaserite ($NaK_3(SO_4)_2$) may precipitate rather than potassium sulfate. While precipitation of glaserite may generally be considered undesirable, it can be separated and undergo further treatment to isolate potassium sulfate.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A process for recovering lithium phosphate from a lithium-bearing solution comprising:
    a) adding phosphate to the lithium-bearing solution to produce a lithium phosphate precipitate;
    b) separating the lithium phosphate precipitate from a solution produced in step a);
    b1) dissolving the separated lithium phosphate precipitate in a solution comprising phosphoric acid at a pH of about pH 4 to about pH 6 to re-precipitate the lithium phosphate;
    b2) separating the re-precipitated lithium phosphate from the phosphoric acid solution.

2. The process according to claim 1, further comprising:
    c) digesting the separated re-precipitated lithium phosphate precipitate in sulfuric acid to produce a digestion mixture and precipitate lithium sulfate therefrom, and separating the lithium sulfate precipitate from the digestion mixture to recover lithium sulfate.

3. The process according to claim 2, wherein the digestion mixture in step c) comprises from 10-50 wt % lithium phosphate solids with lithium remaining in solution up to solubility limits of lithium sulfate in phosphoric acid.

4. The process according to claim 2, wherein digesting the separated lithium phosphate precipitate in sulfuric acid occurs at a temperature from ambient to 80° C. within 1-4 hours.

5. The process according to claim 2, wherein the digestion mixture is concentrated to provide a $H_3PO_4$ concentration of up to 70 wt %.

6. The process to claim 1, further comprising:
    d) adding alkali metal hydroxide to the separated phosphoric acid solution from step b2) or the separated digestion mixture from step c) to produce an alkali metal phosphate solution and recycling the alkali metal phosphate solution to step a) for use as the phosphate.

7. The process according to claim 6, wherein the alkali metal hydroxide and the alkali metal phosphate comprise potassium hydroxide and potassium phosphate, respectively.

8. The process according to claim 1, wherein phosphate is added to the lithium-bearing solution in step a) in stoichiometric excess so that soluble lithium remaining in solution is less than 500 mg/L.

9. The process according to claim 1, wherein the amount of phosphoric acid at step b1) is 50 kg/ton to 250 kg/ton of lithium phosphate precipitate.

10. The process according to claim 1, wherein step b1) produces a slurry having a solids density in a range of 15-40 wt %.

11. The process according to claim 1, wherein step b1) is performed for a period of between 4 hours to 24 hours.

12. The process according to claim 1, wherein prior to performing step a), the process comprises softening the lithium-bearing solution by decreasing calcium content thereof to less than 25 ppm.

13. The process according to claim 12, wherein the softening step comprises adding potassium carbonate or potassium phosphate to the lithium-bearing solution to produce calcium precipitates comprising calcium carbonate or apatite.

14. The process according to claim 13, wherein when the lithium-bearing solution contains fluoride the calcium precipitates comprise fluoroapatite and apatite.

15. The process according to claim 14, wherein greater than 100% stoichiometric amount of potassium phosphate (with respect to fluoroapatite) is added to the lithium-bearing solution.

16. The process according to claim 12, wherein the softening step comprises adding sodium phosphate to the lithium-bearing solution to produce apatite and/or fluoroapatite.

17. The process according to claim 12, wherein the calcium precipitates are separated from the softened solution prior to step a).

18. The process according to claim 1, wherein the process further comprises the step of:
    e) recovering phosphate from the separated solution of step b2) as tri-calcium phosphate and/or apatite.

19. The process according to claim 18, wherein the process further comprises the step of:
    f) recovering potassium from a separated solution from step e) as potassium sulfate.

20. The process according to claim 1, wherein the phosphate is selected from a group comprising phosphoric acid, potassium phosphate, sodium phosphate, or combinations thereof.

* * * * *